Figure 1:
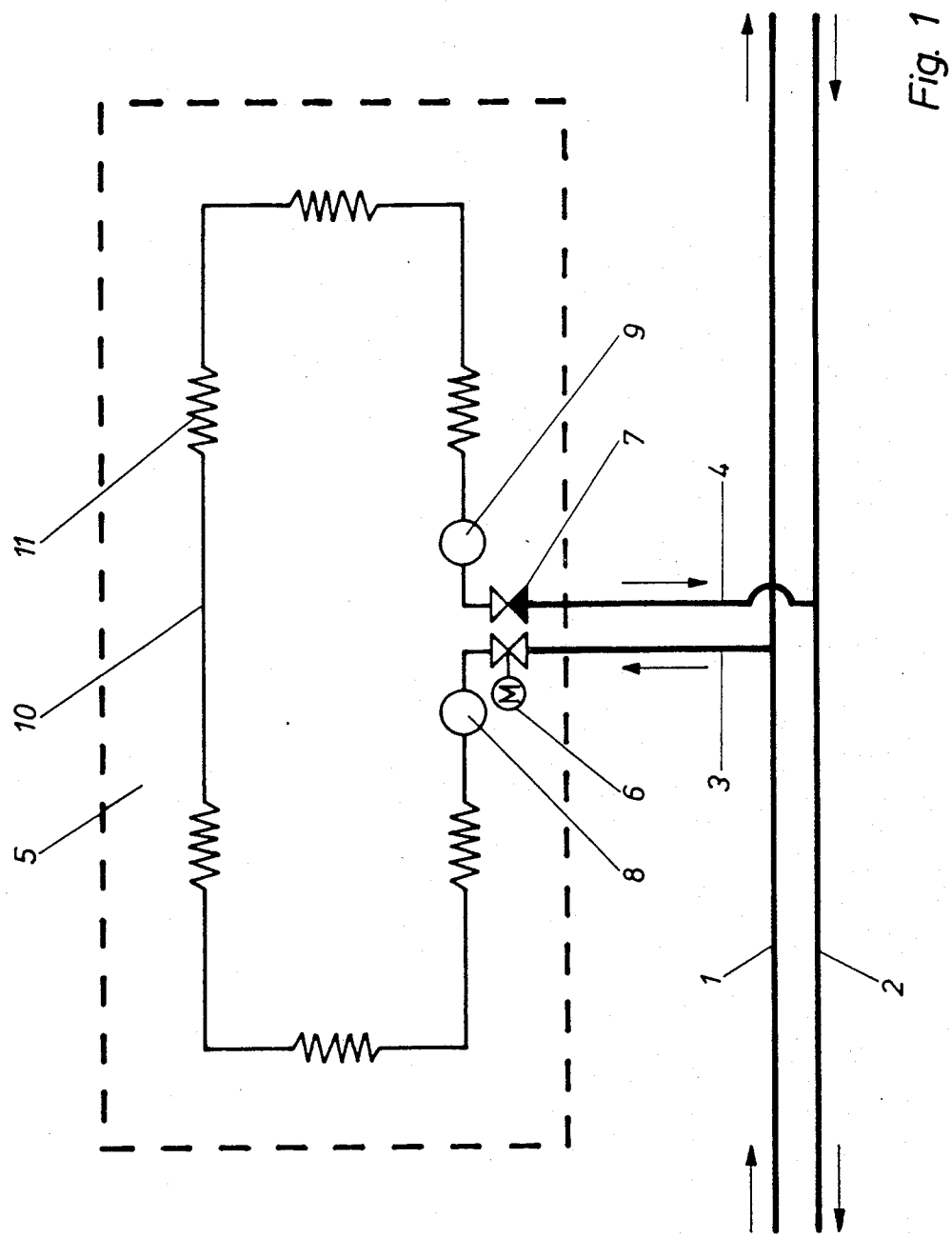

United States Patent [19]
Nielsen

[11] Patent Number: 4,883,087
[45] Date of Patent: Nov. 28, 1989

[54] CENTRAL HEATING SYSTEM AND WATER SYSTEM AND METHOD FOR CONTROLLING THE TIGHTNESS THEREOF

[75] Inventor: Inge Nielsen, Odense, Denmark
[73] Assignee: I.K. Trading Aps., Odense, Denmark
[21] Appl. No.: 100,779
[22] PCT Filed: Jan. 12, 1987
[86] PCT No.: PCT/DK87/00002
  § 371 Date: Sep. 10, 1987
  § 102(e) Date: Sep. 10, 1987
[87] PCT Pub. No.: WO87/04520
  PCT Pub. Date: Jul. 30, 1987

[30] Foreign Application Priority Data
  Jan. 17, 1986 [DK] Denmark ............................... 245/86
  Jul. 28, 1986 [DK] Denmark ............................. 3587/86

[51] Int. Cl.⁴ ............................................. F16K 17/00
[52] U.S. Cl. ................................. 137/458; 73/40.5 R
[58] Field of Search ............... 137/480, 486, 460, 458; 73/40.5 R; 364/42; 165/70; 237/560

[56] References Cited

U.S. PATENT DOCUMENTS 3,695,094 10/1972 Hulme .................................. 73/40.5
4,066,095 1/1978 Massa ................................... 137/486

FOREIGN PATENT DOCUMENTS 3242750 11/1982 Fed. Rep. of Germany ...... 137/486

Primary Examiner—Henry A. Bennet
Attorney, Agent, or Firm—Darby & Darby

[57] ABSTRACT

In order to control the tightness of a central heating system (10, 11) which may be connected to a district heating system (1, 2), the system is provided with a flow meter (8, 9) and a valve (6, 7) in the flow (3) and return pipes (4), respectively. Hereby it becomes possible to monitor the liquid flow through the flow meters (8, 9) and in a control unit (15) to compare the signals from the flow meters (8, 9) in order subsequently to produce a signal for an electric motor on the inflow valve (6) when a certain limit value is exceeded in order to shut off the flow of water into the system (10,11) and to a signalling device (16), if any.

22 Claims, 3 Drawing Sheets 4,883,087

CENTRAL HEATING SYSTEM AND WATER SYSTEM AND METHOD FOR CONTROLLING THE TIGHTNESS THEREOF

The invention relates to a central heating system or a similar closed heating system with inlet and outlet for a heat carrying medium, and a method for controlling the tightnes of the system.

Central heating systems of this type are usually operated with water as the heat carrying medium. The water is either heated in a local heating plant or in a district heating plant.

In such installations the heat carrying medium is common to the whole system, and such systems are called directly connected systems.

By such directly connected systems there will be a risk of large amounts of water flowing out, eg. if a radiator or a pipe bursts resulting in damage to the building. This is due to the considerable quantity of water contained in a system of this type.

If the water flow is not immediately shut off in that part of the system where the leak is, such damage will be very comprehensive since the water will at worst not be shut off until damage has been done, e.g. if there are no persons present.

It is the object of the invention to overcome this disadvange by these directly connected systems, and this is achieved by a system where a volume flow meter with an electric output signal is inserted at the inflow and return flow of the medium, and a motor valve for shutting off the flow through the flow meter and a non-return valve for shutting off the return flow after the return flow meter.

This enables a continuous control by supervising the flowing and returning amount of water, respectively, thus controlling the tightness of the system, because any difference between the inflowing amount and the returning amount indicates a loss of fluid stemming from a leakage. Hereby such a leakage can be detected far away from the installation, and the water flow can be shut off at once, e.g. by actuating the motor valve, which can be electrically driven. At the same time the non-return valve will ensure that no water is led to the system through the return pipe which makes it possible effectively to prevent that no more water escapes than can be helped.

This makes it possible at a very early stage of the leakage to take action and thus prevent any damage to the installation and the building.

By, having a control unit automatically monitor the volume flow meters and signal to the motor valve and maybe an alarm, in case the existence of a leakage has been established, an automatic shutting off of the flawed section of the plant is achieved.

By means, where the signal from the meter is compared with a pre-determined rate of water flow, the supply of water can be shut off effectively, whereby damage to the building or installations dependent on water, animals, plants, etc. can be avoided altogether.

By, making the comparison within a certain time interval, even the smallest leak will be detected, if it is controlled at a time where no water consumption takes place. This will rule out the tremendous waste of water caused by small leaks, water taps that are not turned off, leaky ball cocks, etc.

Figure 2:
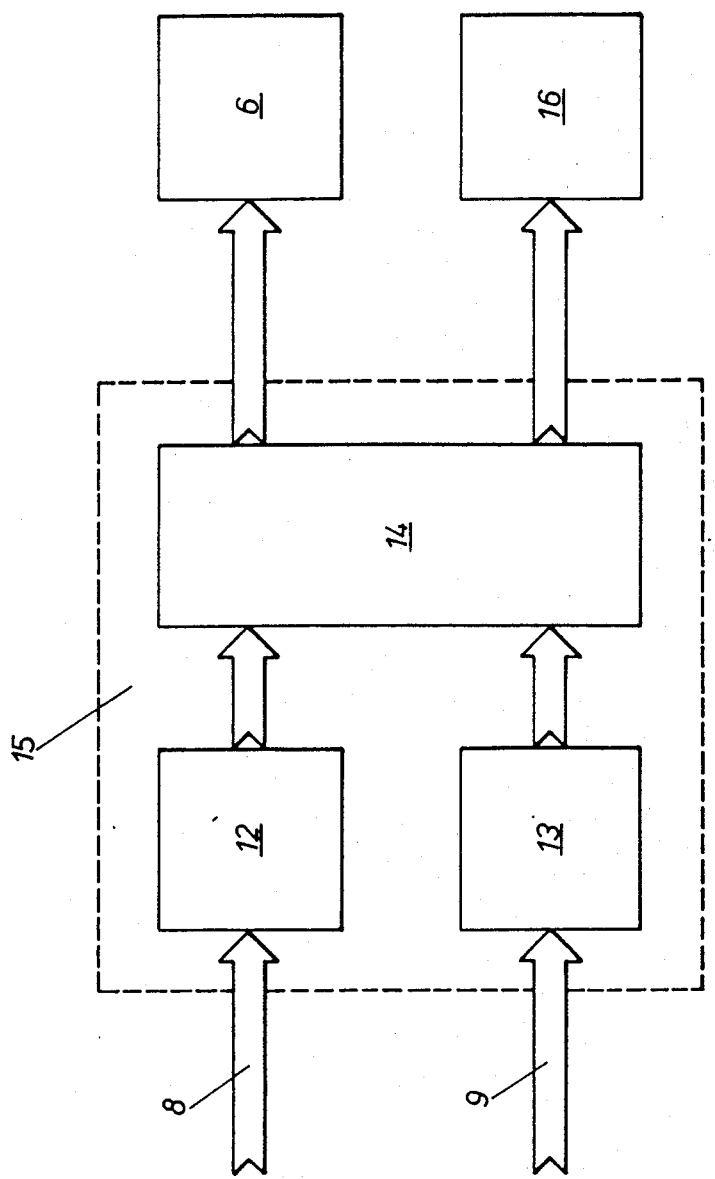
Figure 3:
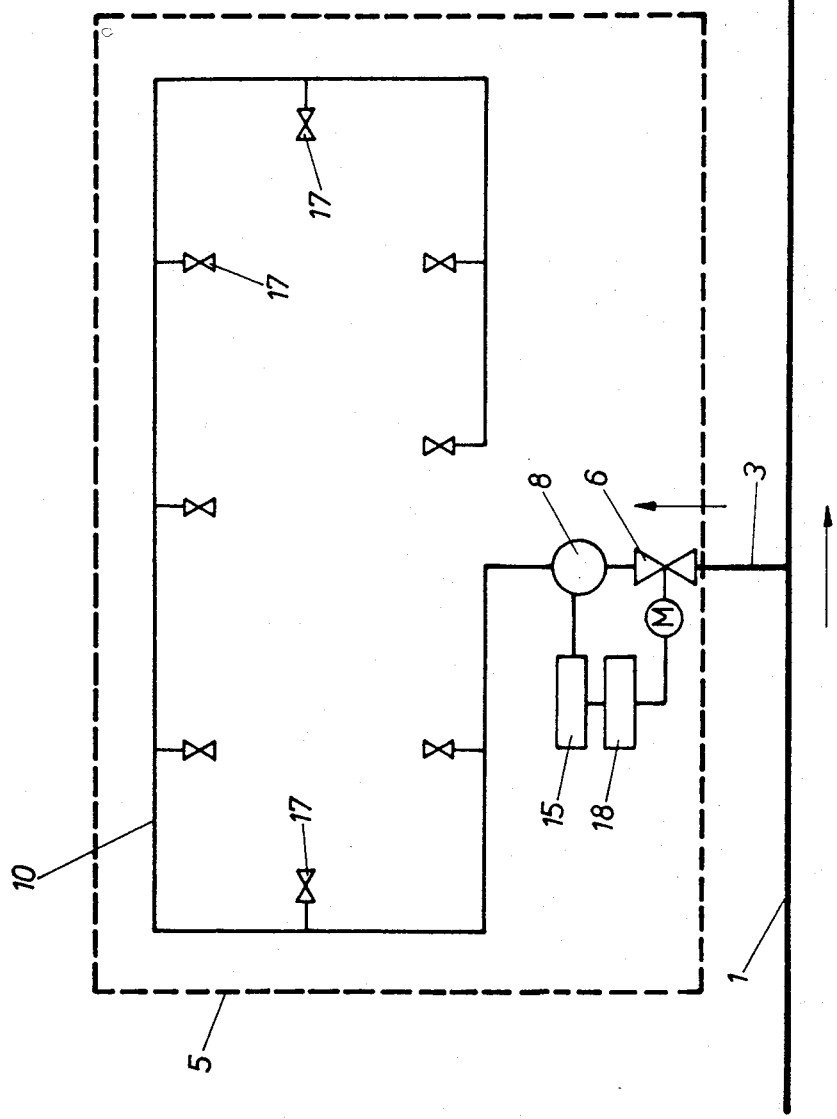

In the following the invention will be described in closer detail with reference to the drawing, in which FIG. 1 shows a pipe diagram of a district heating installation, FIG. 2 shows a block diagram of the control unit, and FIG. 3 shows a pipe diagram of a single-pipe water installation.

In FIG. 1 is shown an example of an embodiment of a system comprising a district heating supply system 1, 2 and a central heating installation comprising radiators 11 with communication pipes 10 in a generally known manner.

The district heating installation comprises a flow pipe 1 and a return pipe 2. Mounted to this installation are the connecting pipes 3 and 4 of the central heating system.

At the place 5 where the system is used, as indicated by a dotted line, an electrically driven motor valve 6 is mounted on the flow connecting pipe 3, which valve, when the motor is actuated, will limit the flow of hot water from the district heating pipe 1.

After the motor valve 6 a volume flow meter 8 with electric output signal is mounted, a so-called flow meter.

In the return end of the system a similar flow meter 9 and a non-return valve 7 are mounted shutting off the water from the return pipe 2 of the district heating system.

In a generally known manner the system comprises a number of radiators or heat exchangers 11 since it is within the scope of the invention to mount flow meters and valves at any required place of a central heating system, where it is desirable to control the tightness of the intermediate section of the installation.

FIG. 2 shows an example of a control unit 15 for carrying out the method for controlling the system shown in FIG. 1.

The flow meters 8, 9 give an electrical signal which is proportional to the amounts of water passing through the flow meters. These signals 8, 9 are transmitted to counters 12, 13, which then record the amount of flowing and returning water, respectively, of the system.

The signals are supplied to a comparison circuit 14 which will show whether there are any disparities above a certain limit between the two signals; if this limit is exceeded, it means that there is a leak in the intermediate sections 10, 11 of the system.

Moreover, a counter control can take place, i.e. an indication as to whether the flow meters work according to their specifications.

Should a disparity be recorded between the two counter values, a signal is produced to the motor of the motor valve 6, which is immediately actuated and shuts off the supply of water into the system.

Moreover, a signal can be given to a visual or auditive alarm 16.

In the comparator 14 a unit is incorporated for rejection of the results measured at a slow flow. If this cancelling of the measuring signal does not happen, especially at low flow rates, undesirable error alarms will occur due to the different inertia and measurement inaccuracies of the measuring means.

The rejection unit likewise makes up for the change of flow that occurs between the measuring means 12, 13 due to differences in temperature and/or pressure in the flow and return flow.

Due to non-linearity in the measuring means 12, 13 there will be at high flow velocities soon occur a difference in the measuring results which is larger than the amount required in order to produce a signal to the motor of the motor valve 6 and actuate the alarm 16. In order to solve this problem the system is provided with a variable cancellation device which, depending on the existing flow, accordingly will zero the measuring process.

By means of these means and this method any leakage will be found immediately, and measures can be taken to repair the leakages while these are minimized because the supply of fresh water into the system is completely shut off. Moreover, measures can be taken to avoid for instance frost bursts and the like.

FIG. 3 shows an example of a control unit in connection with a single-pipe water system in a building.

The system is connected to a main pipe 1 by means of a branch pipe 3. The branch pipe leads into the building 5, as indicated by the dotted line.

Inside the building a motor valve 6 is inserted, whose electric motor can shut off the water supply to the building.

In series herewith a flow meter 8 is inserted which can be provided with an ordinary counter for the water supply to the building. This flow meter furthermore transmits impulses in direct dependence on the water supply through the meter. The signal is sent to an electronic control unit 15 which will be explained below.

The water pipe 10 of the building extends between the user outlets 17 in a generally known manner.

Finally is shown an electronic unit 18, adjustable with respect to time and capacity, which can actuate the control unit 15 to any pre-determined water consumption and time interval.

The control of the water flow in the system will now be described.

Where the system is continuously controlled, the unit 18 is set at upper and/or lower limits as to when the water supply is to be stopped and shut off. Hereafter the electronic control 15 will compare the signal from the flow meter 8 and, when the result is in excess of the predetermined upper and lower limits, produce a signal to the motor valve 6 which will shut off the water supply to the system immediately. This exceeding of the limits will typically be caused by a burst in the pipe system, and further water damage will be prevented.

If the water flow is below the limit, the water flow may either be increased by signalling to the motor valve 6 which will then open for further adding of water, and if this cannot be done, the water supply can be shut off and the installation disconnected, in order that this will not be further damaged due to a lack of water. Moreover, alarm may be given in a generally known manner.

If the system is to be controlled primarily in terms of tightness, the unit 18 can be set to produce a signal to the control unit 15 within e.g. one hour in the middle of the night where usually no water is tapped. Any water consumption will therefore be caused by a leakage which will cause the water supply to stop, because the flow is stopped from flowing through the motor valve 6.

If there is a risk of unnecessarily shutting off the system, the unit 18 can for instance be set to repeat the control, e.g. within the following hour or during any other time interval. This will rule out any unintended disconnection of the system.

By means of this system and this method a simple and reliable control of the water supply is achieved, whereby water damage and interruption of operations of water dependent installations can be avoided.

I claim:

1. A method of controlling water flow in a water system, comprising the steps of:
   detecting a leak in the water system based on a comparison between a signal indicative of the water flow and at least one of a predetermined upper and lower limit of allowable water flow;
   stopping the water flow in response to the step of detecting if the comparison reveals that the water flow is one of in excess of the upper limit and below the lower limit; and
   effecting the steps of detecting and stopping even during an absence of any demand from the water system for water flow into the water system other than that caused by the leak.

2. A method according to claim 1, wherein the step of comparing takes place within a predetermined time interval.

3. A method according to claim 1, wherein the water system has user outlets, further comprising the step of:
   effecting the steps of detecting and stopping even during an absence of any water flow to all user outlets of the water system.

4. A method according to claim 1, wherein the step of stopping includes actuating a valve in the water flow system.

5. A method according to claim 1, wherein the step of detecting includes metering the water flow.

6. A method according to claim 4, wherein the step of actuating also includes actuating an alarm.

7. A method according to claim 1, further comprising the step of:
   repeating the step of comparing at a later time to avoid unnecessarily stopping the water flow, the step of stopping the water flow taking place only after the step of repeating is completed and reveals that the water flow is one of in excess of the upper limit and below the lower limit.

8. A method for controlling water flow in a water system, comprising the steps of:
   detecting leakage in the water system based on a comparison between a disparity between measured flow rates into and out of the water system with predetermined upper and lower limits of allowable disparity;
   stopping the water flow in response to the comparison when the comparison reveals that the disparity exceeds at least one of the predetermined limits of allowable disparity; and
   effecting the steps of detecting and stopping even during an absence of any demand from the water system for water flow into the water system other than that caused by the leak.

9. A method according to claim 8, wherein the water system has user outlets, further comprising the step of:
   effecting the steps of detecting and stopping even during an absence of any water flow to all user outlets of the water system.

10. A method according to claim 8, wherein the step of detecting includes metering flow into and out of the water system to measure the flow rates.

11. A method according to claim 8, further comprising the step of:
    trying to further open a valve to increase flow when the disparity between measured flow rates is below the predetermined lower limit; and
    commencing the step of stopping thereafter only if the disparity between determined flow rates remains below the lower limit after determining that the step of trying to open the valve was unable to produce the increase in the flow necessary to raise the disparity between the flow rates above the lower limit.

12. A method according to claim 8, further comprising the step of:
actuating an alarm during the step of stopping.

13. A method according to claim 8, further comprising the step of:
compensating for changes in the rate of flow occurring due to differences in at least one of temperature and pressure between the flow into and out of the water system.

14. A method according to claim 10, further comprising the step of:
compensating for non-linearity in the step of metering by zeroing the metering.

15. A method according to claim 8, further comprising the step of:
repeating the detecting at a later time before stopping the flow so as to avoid unnecessarily stopping the water flow, the step of stopping the water flow taking place only after the step of repeating is completed and reveals that the water flow is one of in excess of the upper limit and below the lower limit.

16. An arrangement for controlling water flow in a water system comprising:
means for detecting a leak in the water system, said detecting means including means for comparing a signal indicative of the water flow with at least one of a predetermined upper and lower limit of allowable water flow; and
means for stopping the water flow in response to said comparing means if a comparison by said comparing means reveals that the water flow is one of in excess of the upper limit and below the lower limit, said detecting means including means for effecting the comparison by said comparing means even during an absence of any demand from the water system for water flow into the water system other than that caused by the leak.

17. The arrangement according to claim 16, further comprising:
means for avoiding unnecessarily stopping the water flow.

18. The arrangement according to claim 16, wherein said detecting means includes means for effecting the comparison by said comparing means even during an absence of flow through a user outlet of the water system.

19. An arrangement for controlling water flow in a water system, comprising:
means for detecting a leak in the water system, said detecting means including means for comparing a disparity between measured flow rates into and out of the water system with predetermined upper and lower limits of allowable disparity; and
means for stopping the water flow in response to said comparing means if a comparison by said comparing means reveals that the disparity exceeds at least one of the predetermined limits of allowable disparity, said detecting means including means for effecting comparison by said comparing means even during an absence of water flow into the water system.

20. An arrangement according to claim 19, further comprising:
means for opening a valve in the water system when the disparity is below the predetermined lower limit and for causing said comparing means to make another comparison.

21. An arrangement according to claim 19, further comprising:
means for avoiding unnecessarily stopping the water flow.

22. An arrangement according to claim 19, wherein said detecting means includes means for effecting the comparison by said comparing means even during an absence of water flow through a user outlet of the water system.

* * * * *